United States Patent
Casaro et al.

[19]

[11] Patent Number: 6,071,092
[45] Date of Patent: Jun. 6, 2000

[54] VACUUM PUMP WITH IMPROVED BACK-UP BEARING ASSEMBLY

[75] Inventors: Fausto Casaro, Turin, Italy; Larry Hawkins; Patrick McMullen, both of Los Angeles, Calif.; Crawford Meeks, Calabasas, Calif.; Don O'Leary, Blarney County Cork, Ireland

[73] Assignee: Varian, Inc., Palo Alto, Calif.

[21] Appl. No.: 09/037,744

[22] Filed: Mar. 10, 1998

[51] Int. Cl.⁷ ................................................ F04B 17/00
[52] U.S. Cl. .............................. 417/423.4; 417/423.12; 384/102; 310/90; 310/90.5
[58] Field of Search ........................... 417/423.4, 423.12; 384/102; 310/90, 90.5

[56] References Cited

U.S. PATENT DOCUMENTS

| | | | |
|---|---|---|---|
| 3,071,691 | 1/1963 | Haddad | 290/52 |
| 3,650,581 | 3/1972 | Boden et al. | 308/10 |
| 4,023,920 | 5/1977 | Bachker | 417/354 |
| 4,312,628 | 1/1982 | Yamamura | 417/424 |
| 5,059,092 | 10/1991 | Kabelitz et al. | 415/90 |
| 5,166,566 | 11/1992 | Bernhardt et al. | 310/90.5 |
| 5,238,362 | 8/1993 | Casaro et al. | 415/90 |
| 5,485,785 | 1/1996 | Schneider et al. | 101/487 |

FOREIGN PATENT DOCUMENTS 0445 855  9/1991  European Pat. Off. ........ F04D 19/04

OTHER PUBLICATIONS

Patent Abstract of Japan, JP04 072497 A (DAIKIN), Mar. 6, 1992.
FR 2 246 756 A (Leybold Heraeus GmbH & Co Kg) published May 2, 1975 (US counterpart Patent No. 4,023, 920).

*Primary Examiner*—Timothy S. Thorpe
*Assistant Examiner*—Timothy P Solak
*Attorney, Agent, or Firm*—Bella Fishman

[57] ABSTRACT

A vacuum pump has a back-up bearing assembly for allowing its rotor to spin down safely without damaging the pump if the primary bearing system becomes disabled. The drive shaft of the rotor is tubular and contains the back-up bearing assembly in its hollow interior. Back-up bearings are mounted onto a tubular center shaft which is coaxial with and inside the drive shaft. An axial position sensor is nested inside the center shaft and light emitted from its light emitter is reflected by a reflective target inside the drive shaft to detect the relative axial position of the drive shaft with respect to the center shaft. A polymer sleeve is attached to the end of the drive shaft as a thermal compensator, which restricts the axial movement of the drive shaft.

19 Claims, 1 Drawing Sheet

VACUUM PUMP WITH IMPROVED BACK-UP BEARING ASSEMBLY

BACKGROUND OF THE INVENTION

This invention relates to a vacuum pump with a back-up bearing assembly and, more particularly, to such a pump with an assembly provided with a thermal compensator and an axial position sensor.

A vacuum pump, such as a turbomolecular pump, typically having a rotor assembly with integral rotor disks and a pump body with integral stator rings is described in the U.S. Pat. No. 5,238,362 that is incorporated by reference herein. Such a turbomolecular pump rotor, when supported by magnetic bearings, may preferably be provided with back-up bearings which will allow the rotor to spin down safely without damaging the pump, when for example the primary magnetic bearing levitation system is disabled due to a loss of electric power, an overloading of the magnetic bearings or a malfunction of the control electronics takes place. It is further preferable to place such back-up bearing assembly inside the drive shaft of the rotor assembly to provide a compact design and to allow for ease of maintenance as it is disclosed in the now U.S. Pat. No. 5,883,374 filed by Varian Associates, Inc.

In addition, the heat generated by the vacuum pump can be transferred to the drive shaft of the rotor assembly causing thermal expansion. Such growth in the drive shaft can alter the clearances between the back-up bearing surfaces and the inner surfaces of the drive shaft, thus affecting the engagement of the back-up bearings with the drive shaft. The back-up bearing assembly must be able to compensate for possible changes in the clearances to provide for optimum performance, as well as provide for means of monitoring such changes.

SUMMARY OF THE INVENTION

It is therefore an object of this invention to provide a vacuum pump with an improved back-up bearing assembly capable of preventing damage to the rotor and stators due to a failure of the primary bearing system. The back-up bearing assembly of the present invention is better able to maintain the design parameters for engagement of the back-up bearings by compensating for changes in the clearance between a center quill shaft, upon which the back-up bearings are removably mounted, and the inner surfaces of the drive shaft of the rotor assembly. The placement of the back-up bearings inside the tubular hollow cavity portion of the drive shaft allows for easy removal and replacement of the back-up bearings without the need for disassembling the magnetic bearings and the drive motor or other pump components.

A back-up bearing assembly embodying the present invention, with which the above and other objects can be accomplished, may be characterized as comprising one pair of back-up bearings separated by an axial spacer mounted on the outer surface of a center quill shaft disposed inside and coaxially within a tubular hollow cavity of the drive shaft of the rotor assembly, a polymer ring positioned at the opening end of the hollow cavity acting as a thermal compensator to restrict the axial running clearance of the drive shaft and a position sensor attached to the center quill shaft at its front end for monitoring such axial clearance. According to a preferred embodiment of the invention, the position sensor may be characterized as comprising a light emitter and a light receiver for detecting the axial clearance between center quill shaft at its front end facing a reflective target surface mounted at the closed end of the cavity in the drive shaft.

BRIEF DESCRIPTION OF THE DRAWINGS

The accompanying FIG. 1, which is incorporated in and forms a part of this specification, is a schematic sectional side view of a back-up bearing assembly embodying this invention, and together with the description, serves to explain the principles of the invention.

DETAILED DESCRIPTION OF THE INVENTION

Figure 1:
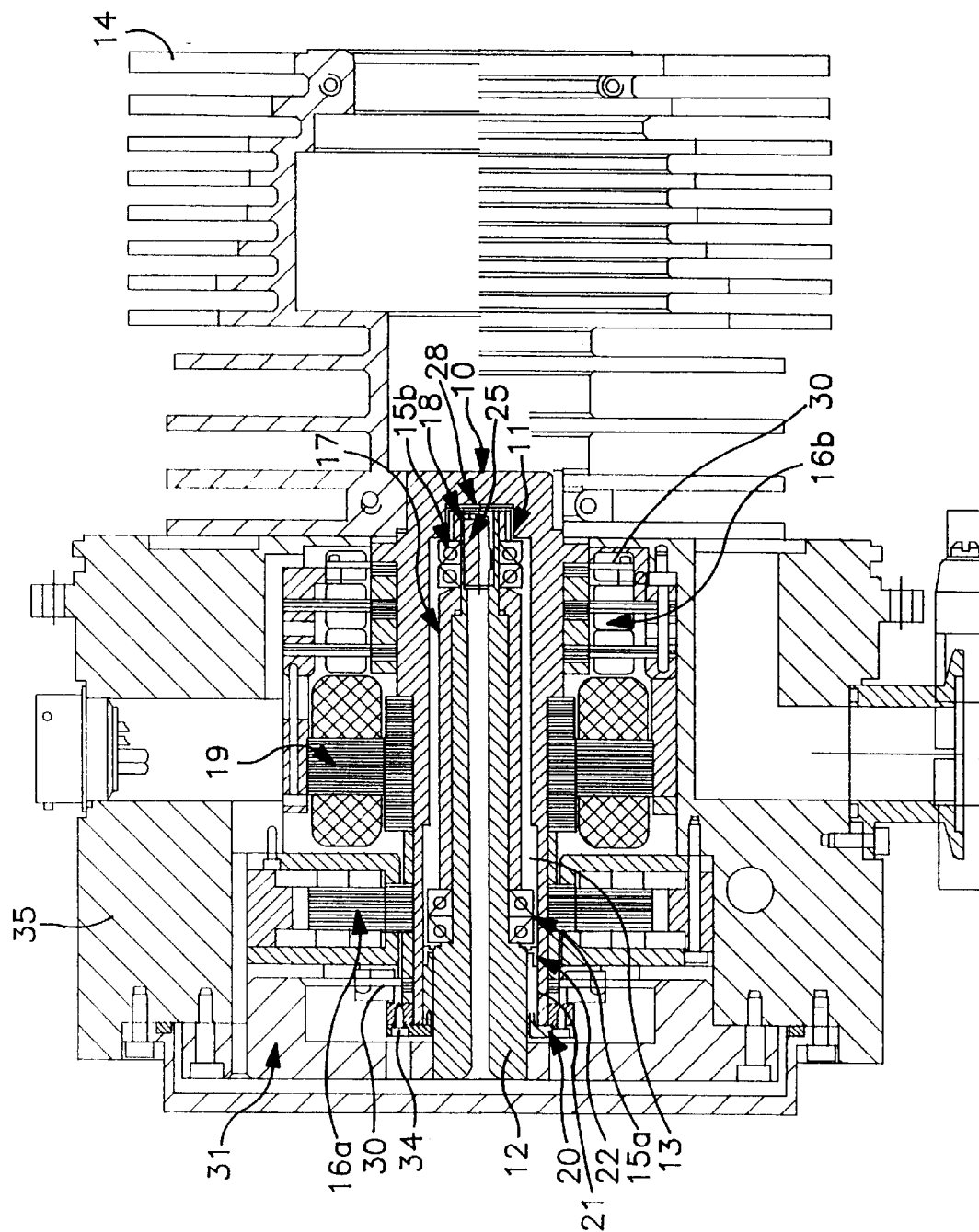

The aforementioned U.S. Pat. No. 5,238,362, issued on Aug. 24, 1993 to Casaro, et al., will be herein incorporated by reference as describing a high vacuum pump comprising a certain number of pumping stages and that may incorporate a back-up bearing assembly of this invention. Each stage consists of a rotor and a stator, as known well in the art. The back-up bearing assembly is provided as a safety system to allow the rotor to spin down undamaged if the primary bearing system is disabled.

As shown in the FIG. 1, the rotor drive shaft 10 has a hollow tubular back end portion forming a closed-ended cavity 13, with the opening being distal from the pump rotor 14, and a center quill shaft 12 that is disposed inside the hollow interior of the drive shaft 10 in a coaxial relationship therewith. The center quill shaft 12 is line-to-line fitted with back-up bearings 15a and 15b and is attached to an end disk 31, which together form a back-up bearing "cartridge." Generally, ball bearings have life-limited characteristics and must be occasionally replaced during maintenance. The present invention greatly improves the ease of providing such maintenance, because the rotor 14, magnetic bearings (an outboard magnetic bearing 16a and an inboard magnetic bearing 16b) and/or drive motor 19 for the vacuum pump need not be disassembled to access the back-up bearings. The back-up bearing cartridge can be simply detached and the back-up bearings replaced.

In the preferred embodiment, two pairs of back-up bearings (an outboard back-up bearing pair 15a and an inboard back-up bearing pair 15b) are mounted onto and around the quill shaft 12. The outboard back-up bearings 15a and the inboard back-up bearings 15b are "back-to-back" duplex pairs of angular contact ball bearings. As shown in the FIG. 1, the outer rings for inboard back-up bearings 15b have a smaller diameter than those of outboard back-up bearings 15a. The angular contact ball bearings rotate if axial and/or radial pressure are placed on their outer rings. It is possible to use different types of bearings and vary the number of back-up bearings used, based on the size of the rotor drive shaft.

A tubular spacer sleeve 17 is interposed between the outboard and inboard back-up bearings 15a and 15b serving to maintain a specified axial distance therebetween and to properly preload the supports when the nut 18 is screwed. A threaded lockable nut 18 around the quill shaft 12 is provided to secure and axially clamp down on the outboard back-up bearings 15a, the spacer sleeve 17 and the inboard back-up bearings 15b. The direction of the thread on the lockable nut 18 is determined so as to prevent the lockable nut 18 from becoming unscrewed by the spin-down torque.

The outer rings of the duplex back-up bearings 15a and 15b have outer diameters that allow them to fit inside the tubular cavity 13 of drive shaft 10 according to predetermined design clearances. The bore of the cavity 13 is just large enough to provide radial clearance to allow the drive shaft 10 to spin without contacting the back-up bearings 15a and 15b under normal conditions. The interior surface of the tubular cavity of drive shaft 10 will frictionally engage the outer rings of the back-up bearings 15 in the event the primary magnetic levitation bearing system fails or shuts down unexpectedly.

The back-up bearings also serve as an axial back-up positional control means, since the rotor assembly will move in axial direction in the event of a loss of magnetic levitation. In the preferred embodiment, the bore of the tubular cavity in drive shaft 10 has at least one shoulder that forms a step. As shown in the FIG. 1, the bore of the tubular cavity 13 is not uniform and step 11 is provided to control the axial motion of the rotor assembly in one axial direction. The bore used to form step 11 is dimensioned to be smaller than the outer diameter of the outer rings of the inboard back-up bearings 15b thereby restricting the axial movement of the rotor assembly. Step 11 will frictionally engage the outer ring of the inboard back-up bearings 15b, if the primary magnetic levitation bearing system fails or shuts down unexpectedly.

As shown in the FIG. 1, a flange shaped metal ring 20 is attached to a polymer sleeve 21 and secured onto the open end of the cavity 13 in drive shaft 10 for the purpose of controlling the movement of the rotor assembly in the axial direction opposed to step 11. In the preferred embodiment, the polymer sleeve 21 has a metal cap 22 that is designed to fit into the open end of the cavity 13 and the inner diameter of the metal cap 22 is dimensioned to be smaller than the outer diameter of outer rings of the outboard back-up bearings 15a thereby restricting the axial movement of the rotor assembly. The flange 20 is secured to the drive shaft 10 by a series of screws 34. In other words, the step 11 and the metal cap 22 together serve as axial control means to provide bidirectional axial back-up contact surfaces to limit axial movement of the rotor assembly in the event of loss of levitation. When in position, the forward end of the metal cap 22 will frictionally engage the outer ring of the outboard back-up bearings 15a, if the primary magnetic levitation bearing system fails or shuts down unexpectedly.

The back-up bearing assembly of the present invention is able to compensate for possible changes in the axial clearances to maintain optimum performance. In vacuum pumps, gas friction, eddy currents, hysteresis losses and other effects can heat the drive shaft of the rotor assembly causing thermal expansion of the drive shaft. Such thermal expansion of the drive shaft can change the clearances between the outer rings of the back-up bearings and the corresponding contact surfaces on the drive shaft, thus affecting the engagement parameters of the back-up bearings. To prevent changes in the axial clearances, the polymer sleeve 21 is preferably made of a material with a higher coefficient of thermal expansion (like in the case of a plolymer vs. steel shaft) than the rotor shaft 10. When the drive shaft 10 is heated and expands, the polymer sleeve 21 expands inward so as to maintain the axial clearance with the outbound back-up bearings 15a. Thus, the expansion of the polymer sleeve 21 compensates for any expansion of the drive shaft 10.

In another preferred embodiment of the present invention, an axial position sensor 25 is nested inside the quill shaft 12 at its forward end. The position sensor 25 is preferably an infrared optical detector that emits light that is reflected back from a planar surface target 28 located at the closed end of cavity 13. The optical detector comprises a miniature light emitting diode (not shown) and photo transistor detector (not shown) set in a resin capsule. The electric current drawn by the axial position sensor 25 changes as a function of the reflected light from the target 28, which directly correlates with the axial clearance between the inboard back-up bearings 15b and step 11, as well as the position of the drive shaft 10 relative to the quill shaft 12 in the axial direction. The controller (not shown) for the magnetic bearing levitation system monitors the current draw of the axial position sensor 25 and controls the back-up bearing clearance by maintaining a constant gap between the axial position sensor 25 and the target surface 28.

The placement of the axial position sensor 25, as described above, has several advantages. Its proximity to the desired axial control location minimizes the error in measuring the position of the drive shaft 10 that may be caused by thermal expansion in the area between the step 11 and the planar surface target 28. Also, placement of the position sensor 25 in the quill shaft 12 within the tubular hollow cavity 13 protects the sensor from contamination due to aggressive pumped gas. The only potential source of contamination is wear debris from the back-up bearings 15, and a shield (not shown) may be employed to prevent such debris from reaching the position sensor 25. Finally, the placement of the axial position sensor 25 inside the quill shaft 12 helps to minimize the size of pump housing 35 required for the magnetic bearing system and helps to protect the sensor from mechanical damage.

The example described above with the FIG. 1 is not intended to limit the scope of the invention. Many modifications and variations are possible within the scope of the invention. For example, radial sensors 30 for detecting changes in clearances in radial directions may be provided. Although the FIG. 1 shows the radial position sensors 30 outside the rotor shaft 10, they may be disposed inside the center shaft 12 in order to minimize the pump size and to protect the measuring probes. The radial sensors may be axially located exactly in the same section where a radial actuator (indicated by numeral 16a and/or 16b in the FIG. 1) is placed, which provides advantages with respect to displacement detection accuracy and control logic simplicity. Although an optical sensor was referenced above, sensors of a different kind may be used. In short, such modifications and variations that may be apparent to a person skilled in the art are intended to be included within the scope of this invention.

What is claimed is:

1. A vacuum pump with a back-up bearing assembly having a rotor pumping section mounted to a rotor drive shaft and a primary bearing system, said back-up bearing assembly comprising:

an axially elongated center shaft having one end proximal to a rotor pumping section and another end distal from a rotor pumping section;

annular bearings fitted on and attached to said center shaft;

a sensor located near the distal end of said center shaft for detecting the position of said rotor drive shaft with respect to said center shaft;

said rotor drive shaft having a tubular hollow cavity with an open end, sidewalls and a closed end, said tubular hollow cavity being distal from said rotor pumping section;

said center shaft and said annular bearings being disposed inside said tubular hollow cavity and positioned coaxially with said rotor drive shaft;

a metal ring secured to the open end of said tubular hollow cavity, and a unit for restricting the movement of said annular bearings along an axis of said rotor drive shaft, said unit being attached to said metal ring;

wherein the sidewalls of said rotor drive shaft frictionally engage said annular bearings when said primary bearing system becomes disabled.

2. The vacuum turbopump with the back-up bearing assembly of claim 1, wherein said restricting unit further comprising a sleeve portion with a cap extending inwardly along said sidewalls of said hollow cavity between said drive shaft and said center shaft.

3. The vacuum turbopump with the back-up bearing assembly of claim 2, wherein said sleeve portion is made of a polymer material and said cap is made of a metal.

4. The vacuum turbopump with the back-up bearing assembly of claim 3, wherein said sensor is for detecting the axial position of said drive shaft with respect to said center shaft.

5. The vacuum turbopump with the back-up bearing assembly of claim 4, wherein said center shaft is tubular and said sensor is held inside a hollow portion of said center shaft at its distal end.

6. The vacuum turbopump with the back-up bearing assembly of claim 5, wherein said rotor drive shaft has a light-reflecting inner surface located at the closed end of said hollow cavity and said sensor is in a face-to-face relationship with said light-reflecting inner surface with a space therebetween.

7. The vacuum turbopump with the back-up bearing assembly of claim 6, wherein said sensor includes a light emitter and a light receiver.

8. The vacuum turbopump with the back-up bearing assembly of claim 3, further comprising a tubular sleeve around said center shaft positioned between a first and second annular bearings and said first annular bearing being located near the distal end of said center shaft and said second annular bearing being located near the proximal end of said center shaft.

9. The vacuum turbopump with the back-up bearing assembly of claim 8, wherein said polymer sleeve has a higher coefficient of thermal expansion than said drive shaft and said sleeve portion has a front cap that frictionally engages said second annular bearing and acts to restrict the axial movement of said drive shaft when said primary bearing system becomes disabled.

10. The vacuum turbopump with the back-up bearing assembly of claim 8, further comprising a step portion in the sidewalls of said drive shaft that reduces the diameter of said hollow cavity, wherein said step portion of the sidewall of said drive shaft frictionally engages said first annular bearing and acts to restrict the axial movement of said drive shaft when said primary bearing system becomes disable.

11. The vacuum turbopump with the back-up bearing assembly of claim 3, wherein said primary system is a magnetic bearing levitation system.

12. The vacuum turbopump with the back-up bearing assembly of claim 3, wherein said center shaft is removably disposed inside said hollow cavity and said annular bearings are removably attached to said center shaft.

13. A turbomolecular vacuum pump having magnetically supported rotor assembly with back-up bearings comprising:
a pump rotor;
a rotor drive shaft for rotating said pump rotor, said rotor drive shaft having a coaxial tubular hollow cavity with an open end, sidewalls and a closed end, said closed end being spaced apart from said pump rotor;
a back-up bearing cartridge disposed within said tubular hollow cavity comprising:
an axially elongated center shaft;
a fastener disposed around an end of said center shaft proximal to the closed end of said tubular hollow cavity;
annular bearings fitted on and attached to said center shaft;
said center shaft and said annular bearings being coaxial with said rotor drive shaft;
at least one sensor for detecting the position of said rotor drive shaft relative to said center shaft;
a unit for restricting the movement of said annular bearings along an axis of said rotor drive shaft; and
a metal ring secured to the open end of said tubular hollow cavity, said unit being attached to said metal ring;
wherein the sidewalls of said drive rotor shaft frictionally engage said annular bearings when a magnetically supported system becomes disabled.

14. The turbomolecular vacuum pump of claim 13, wherein said unit for restricting the movement further comprising a polymer sleeve with a metal cap extending inwardly along the sidewalls of said tubular hollow cavity between said rotor drive shaft and said center shaft.

15. The turbomolecular vacuum pump of claim 14, wherein said fastener is a locknut.

16. The turbomolecular vacuum pump of claim 15, further comprising a sensor for detecting an axial position of said rotor drive shaft relative to said center shaft disposed within said back-up bearing cartridge in proximity to the closed end of said tubular hollow cavity.

17. The turbomolecular vacuum pump of claim 15, wherein said sensor for detecting an axial position is an infrared optical detector.

18. The turbomolecular vacuum pump of claim 17, wherein said rotor drive shaft has a light-reflecting inner surface located at the closed end of said tubular hollow cavity and said sensor for detecting an axial position is in a face-to-face relationship with said light-reflecting inner surface with a space therebetween.

19. The turbomolecular vacuum pump of claim 16, wherein said back-up bearing cartridge removably disposed within said hollow cavity and said annular bearings are removably attached to said center shaft.

* * * * *